(12) United States Patent
Krumholz

(10) Patent No.: US 6,404,132 B1
(45) Date of Patent: Jun. 11, 2002

(54) NEON CRUISING LIGHTS FOR USE WITH MOTOR VEHICLE HEADLIGHTS

(75) Inventor: Spencer Krumholz, Boca Raton, FL (US)

(73) Assignee: Liteglow Industries, Inc., Pompano Beach, FL (US)

( * ) Notice: Subject to any disclaimer, the term of this patent is extended or adjusted under 35 U.S.C. 154(b) by 0 days.

(21) Appl. No.: 09/818,481

(22) Filed: Mar. 27, 2001

(51) Int. Cl.⁷ .................................................. B60Q 1/02
(52) U.S. Cl. ......................... 315/82; 315/77; 315/248; 315/276; 315/246; 362/263; 362/265
(58) Field of Search ............................. 315/77, 78, 82, 315/209 R, 276, 246, 248; 362/183, 198, 226, 243, 246, 247, 223, 263, 265; 439/646, 654, 655

(56) References Cited

U.S. PATENT DOCUMENTS

| 4,322,122 A | * | 3/1982 | Schwartz et al. ............ 439/621 |
| 5,007,863 A | * | 4/1991 | Xuan .......................... 439/639 |
| 5,523,655 A | | 6/1996 | Jennato et al. ............... 315/246 |
| 5,546,290 A | | 8/1996 | Gonzalez et al. ............ 362/223 |
| 5,598,065 A | | 1/1997 | Lakosky ....................... 315/77 |
| 5,618,102 A | | 4/1997 | Ferrell ........................ 362/303 |
| 5,675,220 A | * | 10/1997 | Dault et al. ................. 315/101 |
| 5,832,645 A | * | 11/1998 | Wells .......................... 362/183 |
| 5,923,118 A | | 7/1999 | Jennato et al. .............. 313/485 |
| 6,028,624 A | | 2/2000 | Watkins ....................... 348/122 |
| 6,118,226 A | | 9/2000 | Kohne et al. ................ 315/248 |
| 6,130,511 A | | 10/2000 | Rothwell, Jr. et al. ....... 315/246 |
| 6,152,585 A | | 11/2000 | Barry .......................... 362/473 |
| 6,153,982 A | | 11/2000 | Reiners ....................... 315/248 |
| 6,322,239 B1 | * | 11/2001 | Nitta et al. .................. 362/265 |

* cited by examiner

Primary Examiner—Haissa Philogene
(74) Attorney, Agent, or Firm—Lackenbach Siegel, LLP

(57) ABSTRACT

A neon cruising lighting system for use with a motor vehicle battery includes a motor vehicle headlight having a reflector, a cutout in the reflector, an inert gas discharge lamp capable of irradiating various light colors, disposed in the cutout, a plug assembly adapted to cooperate with a motor vehicle cigarette lighter power receptacle, a transformer electrically coupled to both the plug assembly and the inert gas discharge lamp, so that the plug assembly conducts electrical power from the battery to the transformer to the inert gas discharge lamp, in order to illuminate the inert gas discharge lamp.

34 Claims, 5 Drawing Sheets

NEON CRUISING LIGHTS FOR USE WITH MOTOR VEHICLE HEADLIGHTS

BACKGROUND OF THE INVENTION

1. Field of the Invention

The present invention relates to electric lighting system accessories for motor vehicles. Specifically, the present invention relates to an electric lighting system accessory for use with headlights on a motor vehicle. More specifically, the present invention relates to an electric lighting system accessory for use with headlights on a motor vehicle wherein the headlights incorporate at least one tubular plasma discharge lamp charged with an inert neon fluorescent gas. Even more specifically, the present invention relates to an electric lighting system accessory for use with headlights on a motor vehicle wherein the headlights incorporate at least one tubular plasma discharge lamp charged with an inert neon fluorescent gas, wherein the neon lighting system is able to use a DC power source from a motor vehicle battery through a cigarette lighter receptacle

2. Description of the Prior Art

The modification and adornment of motor vehicles with various types of accessories that are both functional and aesthetic are becoming increasingly common. Products designed for the automotive and electronic aftermarket include such accessories as neon license plate frames, under-car neon light kits, gear shift knobs, signs, speaker rings, various types of fog and driving lights, strobe lights, light dancers, lighted dice, and blacklights. These automobile accessories have contributed to a sprawling industry which reached astounding revenues of nearly 200 billion dollars in 1999, and which is expected to grow at an annual rate of from 3–5 percent annually over the next three years (revenue facts courtesy of LiteGlow Industries).

Aesthetically, the addition of accessory lighting systems to the exterior or interior of a motor vehicle can enhance the natural curves and contours of the body itself, and can accentuate certain areas by drawing visual attention to desired points of illumination.

Functionally, for the drivers of most motor vehicles, turning a corner or making a sharp turn at night can be hazardous. The headlights on most motor vehicles are at fixed positions and can thus fail to sufficiently irradiate in the direction the vehicle is proceeding. Thus, many accidents involving motor vehicles are the result of the drivers failing to recognize and thereby avoid each other. Fog and other aerosols such as dust have caused serious problems in vehicle navigation. Yellow light headlights are often used in these conditions on motor vehicles to illuminate the highway from a position close to the ground. This type of light penetrates the fog where human vision is most sensitive and from a position that reduces backscatter impact.

Conventional headlights merely illuminate an area approximately twenty-five (25) feet ahead of the vehicle. Thus, the driver is normally unaware of the surface conditions on either side or directly in front of the vehicle. Therefore many problems arise when the driver is simply unable to adequately detect glass, sand, potholes, water, loose gravel, pieces of tire, oil, rocks or other items and obstacles which may be disposed on the surface of the road. Serious injury or death may therefore be avoided by improved or proper illumination from the motor vehicle headlight area.

Typically, motor vehicle lighting systems such as tail lights, signals, markers, and headlights use incandescent bulbs as the illumination source. These types of lamps contain a filament that glows white hot when a sufficient electrical current is passed through it. Unfortunately, many disadvantages accompany their use. For example, the filaments used are universally considered to be relatively fragile, and therefore short-lived and requiring frequent and periodic replacement. This time-consuming and expensive maintenance is necessary to keep the vehicle in operative order, and many states have enacted strict laws to combat the driving of autos which have "burnt out" headlights. This problem relating to broken headlights is further exacerbated when the lamps are installed in vehicles that operate in abusive and bumpy terrain conditions, and is most prevalent in situations where an off-road, tractor trailer rig, construction, or heavy equipment vehicle is used. Incandescent headlights illuminate relatively slow and are limited in terms of their aesthetic appeal.

Therefore, various neon gas discharge lamps have been described, which illuminate faster and are more aesthetically pleasing than their incandescent counterparts. These neon lighting systems generally have an internal electrode contained within a sealed envelope of neon fluorescent gas, and is driven by a relatively high voltage ballast. The ballast operates to convert a relatively low voltage to a high voltage which is sufficient to cause the electrode to arc and excite the gas to glow discharge. However, such electrodes are similarly fragile and are prone to breakage, requiring periodic replacement. The ballast in question also has a limited life-span and also requires replacement from time to time. Additionally, the ballast draws extensively on the power source, which in this case is the 12 V DC battery of the car, and can severely strain the ability of the vehicle to function properly.

"Electrodeless" neon gas discharge lamps are also generally well known, wherein the neon gas is sealed within an envelope and surrounded by an RF induction coil that when energized produces RF emissions that excite the neon gas to discharge illumination. In these embodiments, there is no internal drive electrode or filament, thus making this type an attractive option for vehicle lighting systems because of their heightened longevity and consequent reduced need for expensive replacement.

The differing colors of neon discharge light systems are due to the specific and particular atomic emissions of adjustable chemical compositions and gas pressures of the neon plasma.

Varying light colors are thereby gauged by different choices of neon gases, and the use of phosphors. Mercury is often used because of its character as a strong emitter of ultraviolet ("UV") light, and is most commonly used in neon lamps to gain the full range of available phosphor colors.

In common mercury vapor fluorescent lamps, the enclosed mercury vapor is stimulated to emit invisible ultraviolet light that in turn excites a phosphor coating on the lamp wall. The stimulated phosphor then emits the visible light.

Mercury free, rare gas, fluorescent lamps have been attempted. Argon, krypton, and xenon lamps have been operated with phosphors, under a variety of conditions. For neon, it is known that if the lamp was operated at less than five Torr, the gas atoms had sufficient time between collisions to emit UV light to stimulate a phosphor. Neon has a higher first energy band than the other rare gases, so when other rare gases, in concentrations higher than about one percent, are mixed with neon, the spectral output is substantially the result of the other, more easily emitting gases.

Additionally, curved, banded, hooped, or framed neon tube shapes have been described in order to mitigate the chances of breakage or excessive fragility of these tubes which could inhibit their overall productivity and economic efficiency.

U.S. Pat. No. 5,523,655 to Jennato, et al. (Jun. 4, 1996) describes a neon fluorescent lamp and method of operating the lamp. A phosphor is coated on the lamp wall. By properly stimulating the neon, ultraviolet light may be emitted, that can stimulate the phosphor to a first light emission. The lamp may then be operated to produce a visible light emission that is the result of neon emission or of intermediate combinations of the neon and phosphor emissions. A single neon lamp may then produce in one instance, an amber color, or in other instance, a red color without the cold environment problems typical of a mercury based lamp. The output efficiency is enhanced when the lamp is formed as an aperture lamp. The narrow source is also useful as a source in reflector and lens systems. However this application does not contemplate use in conjunction with a motor vehicle headlight or with a cigarette lighter plug assembly.

U.S. Pat. No. 5,546,290 to Gonzalez, et al. (Aug. 13, 1996) describes a neon illumination apparatus and method of using the same for illuminating large and small areas, such as the exterior and interior of a motor vehicle and the like, with bright glowing light. The apparatus includes an elongated transparent tube holder member for receiving an elongated neon bulb and a high voltage power distribution system. The high voltage power distribution system is encapsulated with an end cap adapted to be secured to the tube holder member for insulating and sealing the neon bulb and distribution system from the exterior environment and for forming a unitary illuminating device. The end cap includes an electrical input arrangement adapted to be coupled to a conventional low voltage, direct current source, such as the low voltage electrical system of a vehicle. The high voltage power distribution system includes a power converter for transforming low voltage direct current to low voltage, high frequency alternating current and a high voltage, high frequency transformer coupled to the power converter for generating high voltage, high frequency electrical power to energize the neon tube. The device is mounted in an area to be illuminated, such as the interior or exterior of a motor vehicle, and to connect the apparatus to a source of low voltage, direct current power, such as the low voltage electrical system of a vehicle.

U.S. Pat. No. 5,598,065 to Lakosky (Jan. 28, 1997) describes a lighting system for snowmobiles including two gas discharge lamps charged with an inert gas, i.e., "neon lamps," and electrical components and wiring for operably coupling the lamps to a lower source associated with the vehicle. The lighting system may include an alternating flasher whereby the lamps light alternatively at a selected time interval. However the system does not contemplate use with a vehicle headlight or with a lighter plug assembly.

U.S. Pat. No. 5,618,102 to Ferrell (Apr. 8, 1997) describes a plasma discharge lamp designed for use with plasma discharge light sources such as neon tubes. The lamp provides secondary reflective surfaces to ensure that each ray of light leaving the neon tube strikes at least one metallic reflective surface so as to reduce the troublesome RF characteristic of the neon tube and reduce the interference with other electronic equipment on board the vehicle. The use of RF technology in Ferrell can be adapted for use with the scope of the present invention.

U.S. Pat. No. 5,923,118 to Jennato, et al. (Jul. 13, 1999) describes a neon gas discharge lamp providing white light with improved phospher, the lamp operated to stimulate the neon to emit both ultraviolet light, and visible red light. A phosphor coating responsive to the ultraviolet light produces a complementary green blue light that in combination with the neon red light yields a white light. The lamp is small, efficient, and not subject to the effects of cold that cause mercury based fluorescent lamps to operate poor in cold conditions typical of out of door operation. However Jennato does not contemplate the invention described herein.

U.S. Pat. No. 6,028,624 to Watkins (Feb. 22, 2000) describes a method and apparatus for increased visibility through fog and other aerosols that uses chopped laser illumination, chopped wide baseline stereo imaging, specular reflectors along the path to navigated, comparison of the two stereo images collected to determine and subtract from the images the magnitude of the backscatter field, inverse point spread filtering based on the fusion of the specular reflector pattern, and stereoscopic display for the pilot to allow navigation through fog and other aerosols. In particular, aircraft pilots will be able to land their aircraft in fog and other aerosols. Although the present invention describes the use of neon for navigational purposes, it is limited to airplane use and does not contemplate the scope of the current invention.

U.S. Pat. No. 6,118,226 to Kohne, et al. (Sep. 12, 2000) describes an electrodeless neon light module for a vehicle lighting system that includes a housing having a light-transmissive cover and an RF emission gas discharge light source provided as a self-contained module mountable in the housing. The module includes an envelope filled with an RF excitable gas and an RF induction coil. The envelope and coil are fixed in working relation to one another in a common base. The base also supports an electrical connector that leads to the coil and that mates with a corresponding connector leading from the vehicle power supply. The module and housing have mutually connectable mounting portions for mounting the module on the housing. Kohne fails to describes the scope of the present invention, as no description of a power supply transduced by a standard cigarette lighter plug assembly is described.

U.S. Pat. No. 6,130,511 to Rothwell, Jr., et al. (Oct. 10, 2000) describes a neon discharge lamp which produces an amber color emission for automotive applications. The red emission from the neon discharge when the lamp is operated in a pulsed mode is combined with a green emission from a substituted $Y_3Al_{15}O_{12}Ce$ phosphor coated on the interior surface of the lamp. The resulting amber emission meets both SAE and ECE amber color requirements. Rothwell does not describe the scope of the present invention.

U.S. Pat. No. 6,152,585 to Barry (Nov. 28, 2000) describes an illumination device for motorized two wheel vehicles that is associated with the gas tank of a motorcycle to help illuminate the area in front and to the sides of the motorcycle. The device includes a light panel and a light housing. The light housing is provided with a reflective surface area which reflects light received from a light bulb in the direction in front of the motorcycle and to the side of the motorcycle corresponding to the side of the motorcycle to which the tank is attached. Barry contemplates use limited to motorcycles, does not describe the use of a cigarette lighter plug assembly, does not describe the transformer of the present invention, and involves a summarily different structure for the illumination device disclosed herein.

U.S. Pat. No. 6,153,982 to Reiners (Nov. 28, 2000) describes a discharge lamp and lighting system having a discharge lamp whose discharge vessel is pided with a light-transmitting, electrically conductive layer in order to improve the electromagnetic compatibility of the lamp when it is operated from an electronic operating unit. The light-transmitting, electrically conductive layer is advantageously connected to the circuitry-internal ground potential of the operating unit. Reiners fails to disclose the contemplated invention.

Another problem endemic to all of the cited prior art involves the energization of the neon illumination apparatus, whether within or without a motor vehicle. The problem relates to the fact that neon tubes typically require a relatively higher voltage than direct coupling from a 12 V DC battery source. A routing high voltage cable wire positioned within a vehicle is equally problematic because of the danger to inherent stability and safety. Therefore the use of a high frequency, low voltage transformer mitigates these problems.

No prior art neon lighting system known to the inventor is incorporated as described herein within a motor vehicle headlight system in order to produce myriad functional and aesthetic effects. No prior art neon lighting system has the ability to utilize a standard cigarette lighter plug assembly using a DC power source in a motor vehicle, compatible with a cigarette lighter plug receptacle, from which the system can derive its power. Also, no prior art known to the inventor uses a highly efficient, singular, and specifically designed transformer which effectively manages the requisite high voltage electrical power needed by neon lights, the power being derived from low electrical voltage power from the 12 V DC motor vehicle battery source. A need therefore exists, for reasons of convenience, economic efficiency, energy conservation, ease of use, general functionality, and aesthetics, to provide a motor vehicle headlight system incorporating a neon lighting system that overcomes these problems of the prior art.

SUMMARY OF THE INVENTION

It is therefore an object of the present invention to provide a lighting system for use with a motor vehicle battery, including a motor vehicle headlight having a reflector, a cutout in the reflector, an inert gas discharge lamp disposed in the cutout, a plug assembly adapted to cooperate with a motor vehicle cigarette lighter power receptacle, a transformer electrically coupled to the plug assembly and the inert gas discharge lamp with a coupling means, wherein the plug assembly conducts electrical power, through the coupling means, from the battery through the transformer to the inert gas discharge lamp, in order to illuminate the inert gas discharge lamp.

It is another object of the present invention to provide a lighting system for use with a motor vehicle battery, as described above, wherein the inert gas discharge lamp further includes an envelope formed of a light transmissive material, the envelop having a wall defining an enclosed volume, an electrode operatively coupled to the transformer, the electrode extending through the wall to be in contact with the enclosed volume, an inert gas fill captured in the enclosed volume capable of providing a wavelength light output upon electrical stimulation by the electrode, a phospher coating enclosed in the envelope, the phospher being responsive to the wavelength light output to produce a second wavelength light output in a visible range.

It is another object of the present invention to provide a lighting system for use with a motor vehicle battery, as described above, wherein the phospher coating is selected from the group consisting of Yttrium, Aluminum, Gallium, Oxygen, Cerium, Gadolinium, Lanthanum, and Willemite.

It is another object of the present invention to provide a lighting system for use with a motor vehicle battery, as described above, wherein the phospher coating has been fired in an alumina crucible.

It is another object of the present invention to provide a lighting system for use with a motor vehicle battery, as described above, wherein there is a reflective coating between the envelope and the phospher coating.

It is another object of the present invention to provide a lighting system for use with a motor vehicle battery, as described above, wherein the inert gas fill is a mixture of neon, and an additional gas whose constituents may be selected from the group including argon, helium, krypton, nitrogen, radon, and xenon.

It is another object of the present invention to provide a lighting system for use with a motor vehicle battery, as described above, wherein the mixture of inert gas is varied to produce varying colored light.

It is another object of the present invention to provide a lighting system for use with a motor vehicle battery, as described above, wherein the varying colored light is selected from at least one of the following: red, blue, green, purple, aqua, pink, gold, yellow, apple green, emerald green, tropic green, white, bright white, snow white, coral pink and flamingo pink.

It is another object of the present invention to provide a lighting system for use with a motor vehicle battery, as described above, wherein the transformer is a high voltage, high frequency transformer for supplying the inert gas discharge lamp with sufficient high voltage, high frequency electrical power to cause the lamp to irradiate bright glowing light.

It is another object of the present invention to provide a lighting system for use with a motor vehicle battery, as described above, further including a rectifier operably coupled into the lighting system for rectifying the power produced by the battery.

It is another object of the present invention to provide a lighting system for use with a motor vehicle battery, as described above, further including a flasher operatively coupled into the lighting system for repeatedly, temporarily and alternatively activating the inert gas discharge lamp.

It is another object of the present invention to provide a lighting system for use with a motor vehicle battery, as described above, further including a pulse generator connected to the electrode for forming a discharge to electrically stimulate the inert gas fill.

It is another object of the present invention to provide a lighting system for use with a motor vehicle battery, as described above, wherein the inert gas discharge lamp is disposed in the cutout with an annular rubber grommet.

It is another object of the present invention to provide a lighting system for use with a motor vehicle battery, as described above, wherein the inert gas discharge lamp is a self-contained electrodeless inert gas discharge module.

It is another object of the present invention to provide a lighting system for use with a motor vehicle battery, as described above, wherein the self-contained electrodeless inert gas discharge module includes a sealed envelope that is at least partially light transmissive, an inert gas fill sealed within the envelope, and an RF induction coil external to the sealed envelope, operatively connected to the battery.

It is another object of the present invention to provide a lighting system for use with a motor vehicle battery, as described above, further including a circuit breaker switch for disconnecting the lighting system from the electrical power supplied by the cigarette lighter plug receptacle.

It is another object of the present invention to provide a lighting system for use with a motor vehicle battery, as described above, wherein the switch is located on the plug assembly.

DETAILED DESCRIPTION OF THE PREFERRED EMBODIMENTS

Embodiments of the present invention are described below with reference to FIGS. 1 through 6.

A motor vehicle, which in this case can be a sports utility vehicle, recreational vehicle, truck, rig, motorcycle, off-road vehicle, or van, can be equipped with the neon cruising light system contemplated by the present invention.

Figure 1:
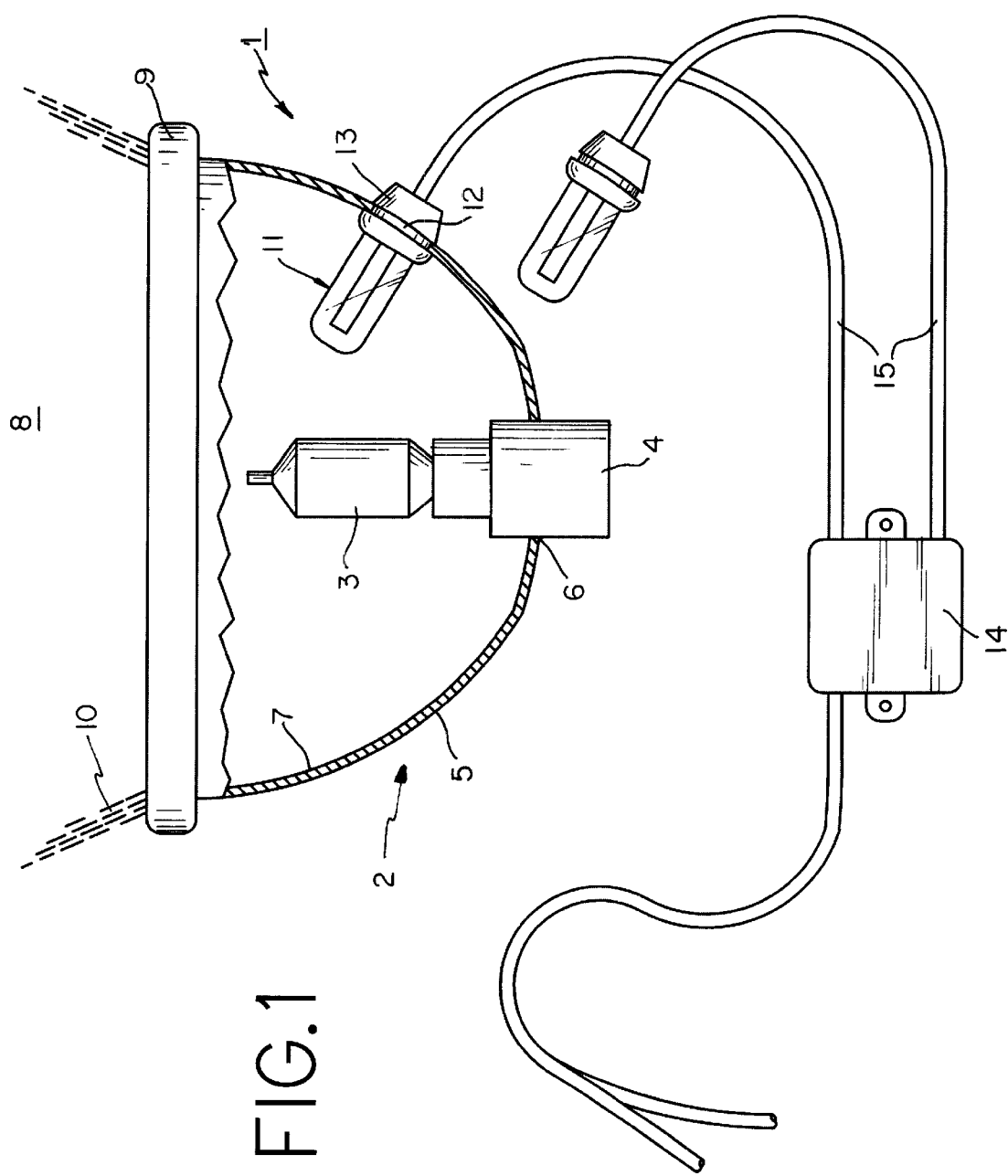
FIG. 1 illustrates a general schematic of the neon cruising lighting system contemplated herein.

In FIG. 1, one perspective of the neon cruising light system 1 is depicted. For purposes of simplicity, attention will be focused on only one of the headlights 2. It should be noted that each headlight 2 will be equipped with identical components and structure.

The headlight 2, which can be a composite headlight, has a headlight bulb 3 that is inserted in the apex region 4 of the body member 5. The headlight bulb 3 can be any conventional light bulb, low temperature bulb, low voltage bulb, fluorescent bulb, halogen bulb, neon light, gas discharge lamp, incandescent bulb, or any suitable lamp, all of which are considered to be within the scope of the invention.

The motor vehicle headlight body member 5 has at least one headlight bulb cutout 6 wherein the bulb 3 is placed. The inner surface of the body member 5 is a reflector 7, and can be composed of foil, a shiny or glossy surface, synthetic plastic, or metal, in order to reflect the light generated by the headlight bulb 3, as described above, in various directions both inside the body member 5 and directed towards the outside of the headlight 8. The reflected light 10 will travel outwards through the headlight lens 9 to illuminate the adjacent front surroundings to provide a driver with information as to what he or she is about to travel either through or over during nighttime travel. The headlight lens 9 can be either transparent or otherwise light transmissive, composed of glass or synthetic plastic, and is attached by conventional means such as adhesives, clips, or other suitable means, to the body member 5. The lens 9 can be smooth so that the light 10 can pass through it without being inhibited or negatively influenced. The neon light emitting element 11 is inserted within a neon cutout 12 and is affixed therein with the use of an annular rubber grommet 13 surrounding the neon light element 11. The grommet 13 also acts as a stabilizer for the neon light element 11, protecting it from undue vibration or damage resulting from movement of the vehicle. The neon light emitting element 11 are then each connected to a black box 14, by electrical connecting means, which contains the transformer (described below).

The light 10 emitted by the headlight bulb 3 and neon light element 11 is reflected by the reflector 7 as a light bundle 10 which passes through the lens 9 and is dispersed. The reflector 7 can have, for example, an approximately ellipsoidal shape, an ellipsoid-like shape, or a numerically determined shape produced from the characteristic of the light bundle 10 to be reflected by the reflector 7.

Figure 2:
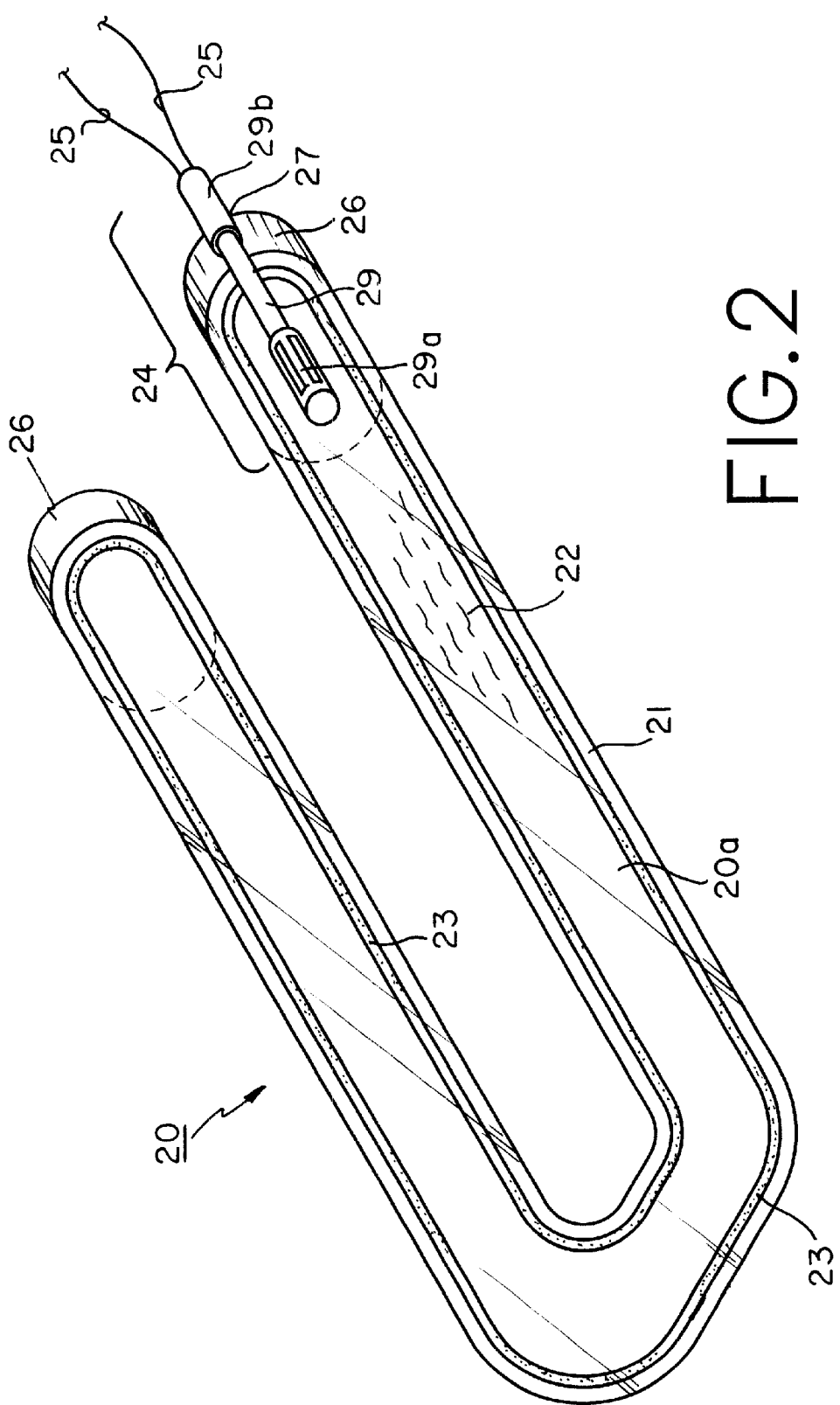
FIG. 2 is a perspective view of a curved neon light emitting element as contemplated in the present invention.

Referring now to FIG. 2, a closer illustration of the invention includes two cylindrical, curved neon light elements 20. For purposes of simplicity, and because each neon light emitting element 20 is substantially identical with respect to structure and function, only one element 20 will be described. The neon light element 20 includes a curved outer envelope tube 21. Each envelope tube 21 is preferably formed from glass and has a diameter of a minimum of from about 2 millimeters. The glass lamp tube 21 may be made of transparent soda glass or a borosilicate glass and is charged or pumped with an inert gas fill 22 such gas as argon, neon, krypton or xenon under a pressure from several mmHg to several hundred mmHg. Neon gas in its pure form will glow red when conducting electricity. Argon with a drop of mercury will produce a blue color. Different colors can be achieved through coating the neon glass tube 21 with phosphorus 23. Coating the tube 21 that contains neon (red) with a white phosphorus coating, for example, will produce pink. Neon is used for colors on the red range of the spectrum, and argon mixed with mercury is used for the blues. When looking at neon light, red and blue shine the most brightly, while white, purple, and green have a softer glow. This is due to the fact that red and blue are shining through clear glass, while the glow of other colors is damped by the coating.

As stated above, the neon light element 20 is a curved, generally tubular cylinder and includes an outer clear protective envelope tube 21. The tube may optionally be formed from "Voltarc" glass, manufactured by Voltarc Tubes, Inc., Fairfield, Conn., available through any neon glass design shop or neon dealer, and is pumped or charged with an inert gas fill 22, neon or argon being preferred for providing a orange-red light or a blue light, respectively. Each end of the lamp is substantially the same, except that one end includes a typical electrode arrangement 24 with a pair of wire connectors 25 extending therefrom.

Optionally, the envelope 21 can be formed of a clear Lexan RTM material (a General Electric product) having a thin wall. Each end of the envelope tube 21 can be sealed closed by a friction fit plastic cap button 26, with one end having a small aperture 27 through which the electrode arrangement 24 passes. A wire knot 28 or suitable stop is provided to make sure the wires are held in place with respect to the electrode arrangement 24. Electrode efficiency, and electrode durability are important to overall lamp performance.

The preferred electrode is a cold cathode type with a material design that can operate at a high temperature for a long lamp life. A molybdenum rod type electrode 29 may be formed to project into the enclosed envelope volume 20a, with a cup 29a positioned and supported around the inner end of the electrode rod 29. The cup 29a may be formed from nickel rolled in the shape of a cylinder. Preferably, it is a tubular metal section. The cup may be attached by crimping or welding to the electrode rod 29. The electrode arrangement 24 is therefore fabricated of molybdenum shafts supporting crimped on nickel cups. Each nickel cup 29a can be coated with an alumina and zirconium getter material, known as Sylvania 8488.

The molybdenum rod 29 can have a diameter of a fraction of a millimeter. The exterior end of the molybdenum rod 29 can be butt welded to a thicker outer rod 29b. The inner end of the outer rod 29b can be extended into the sealed tube 21. The thicker outer rod 29b is more able to endure bending, than the thinner inner electrode support rod 29. The cup 29a extends farther into the envelope 21 than the inner rod 29.

The end cap 26 of each side of the neon light element may optionally made of such material such as "Plastidip", manufactured by PDI, Inc of Blaine, Minn.

Figure 3:
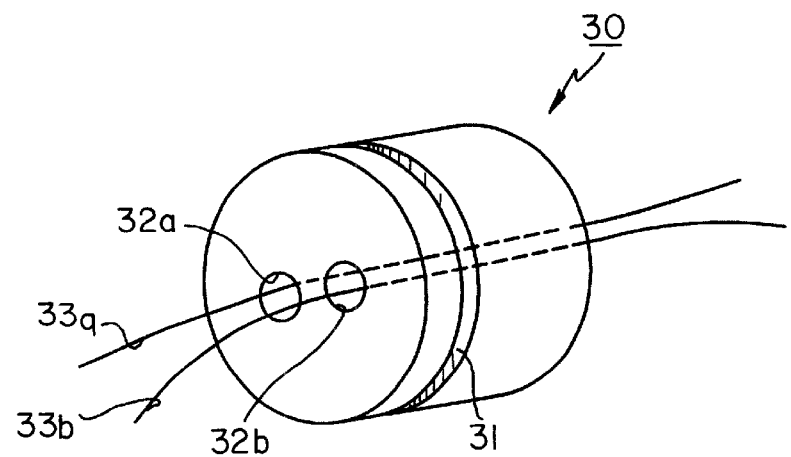
FIG. 3 is a perspective view of the rubber annular grommet wherein the neon light emitting element is positioned.

In FIG. 3, the end of the neon light element is positioned into an annular rubber grommet 30, mentioned above, which is a type of a cylindrical "stopper," which is shaped to be conducive to being placed within the neon cutout described in FIG. 1, with the aid of an annular incision 31 which completely surrounds a middle periphery of the grommet 30. The grommet 30 has two apertures 32a, 32b wherein the ends of the curved light element can be fit, and correspondingly where two electrical circuit 33a, 33b wires can be placed. As described above, the grommet 30 can be placed inside the back of the headlight reflector in the neon cutout.

It should be noted that the gas fill contained within the envelope is preferred to be substantially pure, research quality neon. The purity of the neon gas fill, and cleanliness of the lamp are important in achieving proper lamp color. Similarly, mercury can be used in the lamp. While mercury reduces the necessary starting voltage in a discharge lamp, mercury also adds a large amount of blue, and ultraviolet light to the output spectrum. Mercury based lamps are sometimes difficult to start in cold environments. Other gases, such as argon, helium, krypton, nitrogen, radon, xenon and combinations thereof, could be included in the lamp, in minor concentrations (neon is substantially pure) in order to derive such varying colors as green, pink, blue, red, purple, pink and aquamarine. In general these other gases have lower energy bands than neon, and therefore even in small quantities, tend to either dominate the emission results, or quench the neon's production of ultraviolet and visible light. Pure, or substantially pure neon is then the preferred gas fill.

The gas fill pressure affects the color output of the lamp. Increasing pressure shortens the time between atomic collisions, and thereby shifts the population of emitting neon species to a deeper red. By adjusting the pressure, one can then affect the lamp color. At pressures below 10 Torr, the chromaticity is outside the SAE red range. At 70 Torr the neon gives an SAE acceptable red with chromaticity figures of 0.662 and 0.326. At 220 Torr, the color still meets the SAE requirements, but has shifted to a deeper red with coordinates of 0.670 and 0.324. With decreasing pressure the emitted light tends to be orange.

By varying the parameters of pressure and gas type, therefore, the preferred colors of the light produced in the present invention are contemplated to be, for example, red, blue, green, purple, aqua, pink, gold, yellow, apple green, emerald green, tropic green, white, bright white, snow white, coral pink and flamingo pink, all of which are commercially available from Neon Art Works in Las Vegas, Nev. 89109, for example.

The neon gas fill may have a preferred pressure from 20 Torr to 220 Torr. At pressures of 10 Torr or less, the electrodes tend to sputter, discoloring the lamp, reducing functional output intensity, and threatening to crack the lamp by interacting the sputtered metal with the envelope wall. At pressures of 220 Torr or more, there must be a stronger electric field to move the electrons through the neon, and is thus economically wasteful. Lamps above 300 Torr of neon are therefore considered to be impractical in the art, due to the increasing hardware and operating expense. The effect of pressure depends in part on lamp length, sometimes referred to as the arc gap.

Returning to FIG. 2, the envelope tubing 21 can be optionally constructed out of hard glass or quartz. The selection of the envelope tubing 21 material is important. The preferred tubing material must not excessively devitrify, or "outgas" at the temperature of operation, and should also substantially block the loss of the gas fill. Another suitable envelope material is aluminum silicate, considered in the art to be a "hard glass," and is available from Corning Glass Works. This type of material is known as "type 1724." Type 1724 is a hard glass that substantially arrests all neon loss. The 1724 glass may be baked at 900° C. to drive out water and hydrocarbons.

This type of severe heating improves the relative purity of the envelope and its corresponding clarity, and this aids dramatically in the standardization of the various colors that can be produced, and additionally can improve the longevity of the entire neon lamp apparatus. The envelope tubes of the present invention are selected primarily for their ease in forming curved shapes. The bent tubes are then filled and sealed. These types of glasses, if operated at the higher temperatures of more intense discharge, release the lead, or other chemical species of the glass into the envelope. The glass is then considered to be devitrified, or stained, and the gas chemistry is then changed. This devitrification results in a corresponding and often undesirable lamp color change.

The use of pure quartz as an envelope material is not appropriate either, because pure quartz has a crystalline lattice-like structure that provides various porous openings for the gas fill to escape, thereby dissipating the effectiveness of the gas fill. Gas fill loss from the envelope depends primarily on the temperature of the envelope and the gas pressure, i.e., a high pressure lamp is more susceptible to gas fill loss, and consequently a color change.

Again in FIG. 2, the inside surface of the envelope 21 can optionally be coated with a yttrium, aluminum, or cerium phosphor 23 composition. The lamp envelope 21 coated with a phosphor 23 should be responsive to the ultraviolet radiation lines of neon. Numerous phosphors are known, and normally they are adhered to the inside surface of the lamp envelope 21. Almost any phosphorescent mineral held in a binder is thought to be potentially useful. The preferred phosphor for the color amber has an alumina binder and includes yttrium alumina ceria. Optionally, Sylvania type 251 phosphor can be used, whose composition includes $Y_3A_{15}O_{12}Ce$. Willemite (also known as zinc orthosilicate) phosphors also work, but are less preferred.

Figure 4:
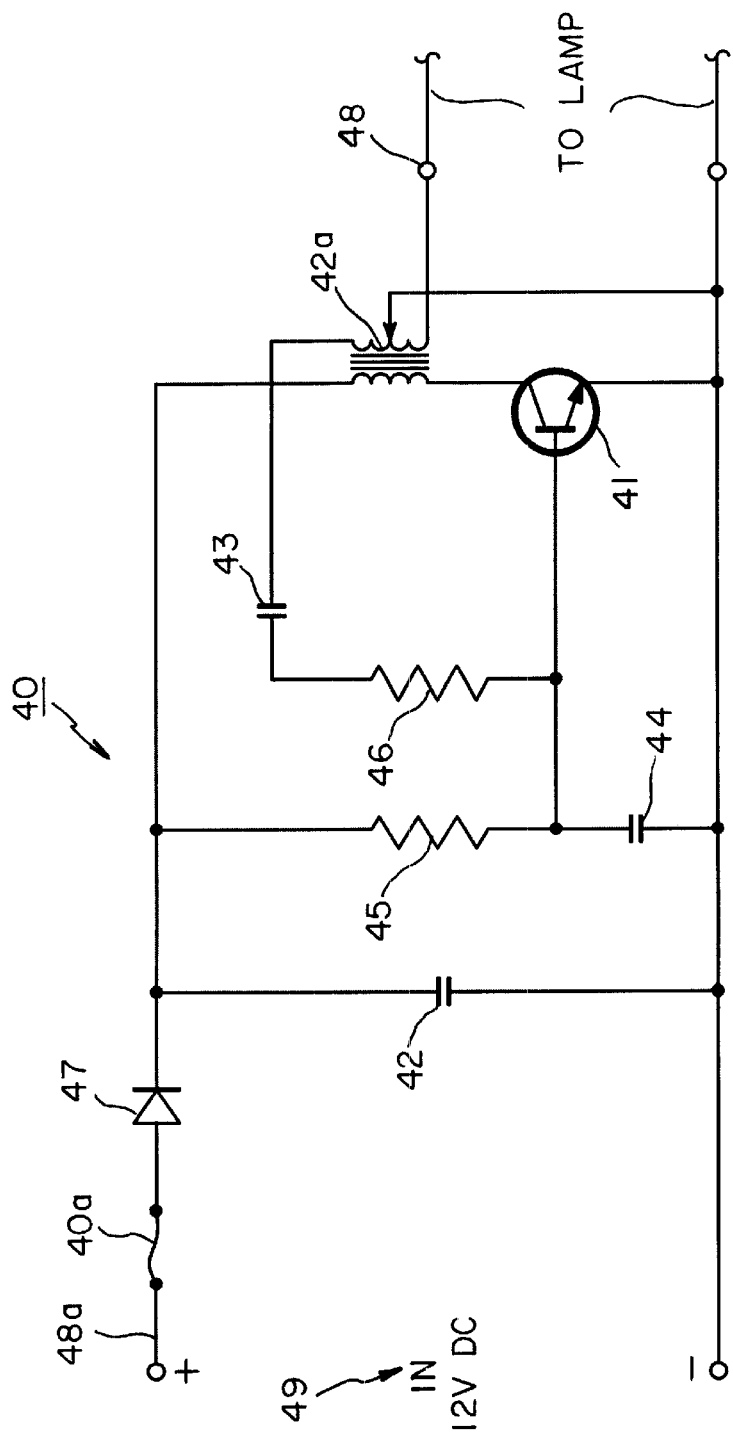
FIG. 4 is a circuit diagram of the black box included in the neon cruising lighting system, having a transformer.

In FIG. 4, the neon cruising lighting system of the present invention includes the pair of neon light elements that are coupled into a black box 40. The transformer has an input consisting of a bipolar transistor 41 and switching circuitry. Depicted schematically are capacitors 42, 43, 44, resistors 45, 46, a zener diode 47 and a feedback winding, preferably adapted to oscillate the output windings at 20,000 hertz to obtain the desired output voltage. An electric coupling 48, preferably covered with a silicon polymer, operably couples or connects the neon cruising lights, and the DC current battery 49 of the motor vehicle is contemplated within the present invention to be the chief power source herein.

The connection to the power source 49 via the coupling 48a can either be direct, or via a cigarette lighter plug assembly, described below. Therefore, within the transformer black box, the 12 V DC power source 49, here the motor vehicle battery, is operatively connected into a fuse 40a which then connects into the zener diode 40a. This is spliced then into a first capacitor 42, a first resistor 45, a second capacitor 43, a second resistor 46, a third capacitor 44 into a transistor 41, and then through the transformer coil 42a out to the neon lamps.

An on/off toggle switch can operably be connected to the neon lighting system to allow the driver or passenger of the motor vehicle to control the neon cruising lighting system. The switch can be a model number 9330, commercially manufactured by the Levitron Corporation, and can be positioned on or near the dashboard of the motor vehicle, underneath the motor vehicle hood, or near the neon lights.

Alternatively, the black box 40 may include a pulse generator. During pulse-mode operation the preferred electronic states of neon are the 3P electronic orbitals which decay to the 3S level, producing two important red emission lines at about 638 and 703 nanometers. The 3S level is the lowest excited level of the neutral neon atom and the decay of electronic states from this level produce emission in the vacuum ultraviolet around 74 nanometers in wavelength.

There are four arrangements or configurations for an available electron with sufficient energy to be positioned in the 3S position or orbital. Two of these configurations permit energy release by light radiation. The other two configurations are "frozen" forming metastable conditions of the neon atom. During gas collisions or interactions the two metastable conditions may be perturbed, permitting release of the energy either through light radiation or by inelastic means such as an excitation of phosphor sites on the coating.

A short current pulse discharge is necessary. A pulse of less than 3 microseconds is recommended, with pulses of from 1 to 2 microseconds or less being preferred. Ideally, in one instant, all the neon could be raised to the 3S and 3P states, but it is difficult to generate electron pulses with short durations (less than 1 microsecond) that still have sufficient average energy. As the length of the pulse increases, the 3S and 3P levels become less favored with respect to higher orbitals. The longer the pulse becomes after 2 or 3 microseconds, the more likely other neon orbitals will become populated, and the less likely the 3S and 3P orbitals will be populated.

Exciting the neon to the upper levels is undesirable because, for the most part, the available subsequent decay channels are not in the visible red region but occur in the near infrared. These higher neon levels may not even decay in a "cascade" fashion to the 3S level which is needed to produce the ultraviolet light and metastable levels. As pulse duration increases, collisions between atoms, ions and electrons increase, providing additional energy loss mechanisms that may not involve emission in the visible, for example in the infrared.

Once the neon becomes populated in the 3S and 3P orbitals it is necessary to allow the neon to decay spontaneously, emitting the ultraviolet radiation. By continuing the electric field, the neon can be excited to additional, higher orbitals, leading to emissions with a wider range of wavelengths. The off period therefore preferably goes to zero voltage. The off period should be long enough to allow the neon to decay (emit the ultraviolet radiation).

Returning to the pulse on state before all the neon has decayed catches some neon atoms in an excited state, and drives them up into higher orbital states. The shorter the off period, the more atoms are caught, and the greater the spectral shift is away from the ultraviolet region.

Waiting for all of the neon to decay gives a spectra that has the most concentrated ultraviolet. However, returning to the pulse on state only after the decay of all the neon is inefficient, and only reduces the lamp's total output. Also, the longer the off period, the more difficult it is for the ballast to re-ionize the neon, and provide high power. There is then an efficiency balance to be struck. The off period at a minimum should be long enough to allow some of the neon to decay. More preferably, the off period should be equal to or longer than the average decay period of neon from the 3P and 3S orbitals (lifetime).

In practice, the off period should be on the order of the bulk decay time of the neon discharge, but need not be longer than the period for complete decay from the same states for all the neon. An off period of less than 5.0 microseconds is ineffective in producing ultraviolet light, whereas an off period of greater than or equal to 20 microseconds is effective in producing ultraviolet light.

By adjusting the on period, or the off period, the ultraviolet output of the lamp can be increased or decreased. The effect of adjusting the pulse duration on the excitation of the phosphor is exploited to produce a variable color light source. Color can be varied by shifting the amounts of the phosphor emission and the underlying neon emission. In a completely coated tube, the neon emission that filters through the phosphor coating, and the excited phosphor emission, mixto give the observed color. Some reduction in the neon emission strength occurs, but for optics involving reflector applicators or concentrators a uniform intensity profile of the source is important. The gas pressure, pulse width, and repetition rate may be adjusted to optimize the contributions from the neon and phosphor emissions.

In some situations it may even be desirable to change colors by gradually reducing the phosphor contribution and enhancing the residual neon emission. This can be accomplished by gradually increasing the duty cycle of the pulsed power out to a steady direct current AC or DC condition. The pulse on, or pulse off periods may be adjusted. Another method of operation is to provide different pulse types in the series of pulses. Pulses of one type are directed at simulating the phosphor along with the visible neon emission. These may be alternated with pulses of a second type directed at stimulating just the visible neon emission. Since the pulses occur rapidly, the eye averages the lamp output. The ratio of the numbers of the two (or more) pulse types in any short period of time may be adjusted in the input stream to shift the lamp color.

In an alternative embodiment of the neon cruising lighting system of the present invention, the neon cruising lighting system includes a relay rectifier pod whereby the neon cruising lighting system may be used with a motor vehicle without using its battery. The inputs for the relay rectifier pod may be coupled to a 12 V AC power source, such as the electrical coupling means coming out of the engine of the vehicle, or to a typical, commercially available 12 V AC voltage regulator.

Figure 5:
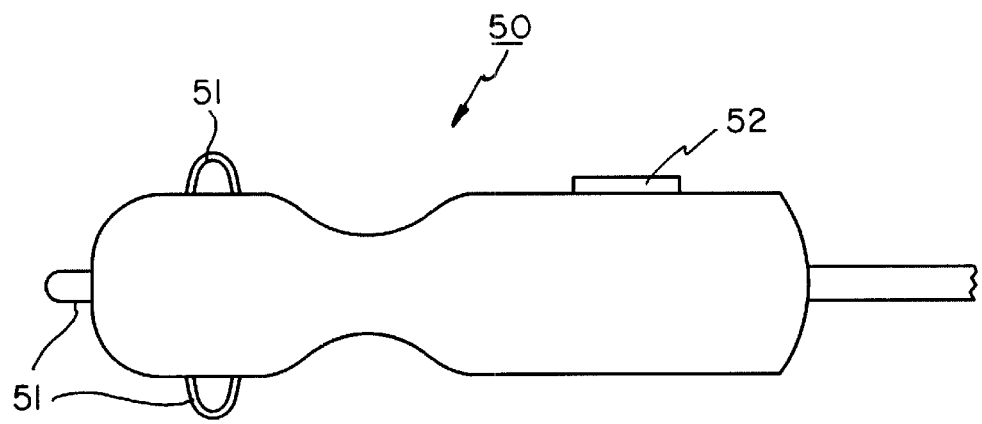
FIG. 5 is a perspective view of the cigarette lighter plug assembly as contemplated herein, including a switch operator useful for activating a circuit breaker located within the assembly (not shown).

As stated above, the system in can accommodate a standard cigarette lighter plug assembly 50, in FIG. 5. This plug assembly 50 will in turn be connected to the motor vehicle battery through the cigarette lighter plug receptacle (not shown), and use DC current.

Relating to the cigarette lighter plug assembly, the assembly duplicates the configuration of the cigarette lighter receptacle relating to interfitting. The plug assembly 50 has electrical contacts 51 to conduct 12 V from the motor vehicle battery to the neon lighting system. A circuit breaker (not shown) for disconnecting the system from the power from the electrical contacts can be disposed within the plug assembly. A switch operator 52 can be disposed upon an accessible surface of the plug assembly. The assembly connects into the electrical coupling 53 leading to the transformer.

Due to the fact that some cigarette receptacles are connected to power only when the ignition switch has been moved to an operative position while others are constantly energized, the switch operator on the surface of the plug assembly can conserve battery power when the motor vehicle is not in use, and can extinguish the light at times when it may be distracting to the driver or is otherwise objectionable.

The receptacle is standardized in dimension and configuration throughout the automotive industry in the United States, with the result that the dimensions and configuration of cooperating plugs are widely known. Also standard is the location of the electrodes on the plug assembly and the receptacle.

Alternatively, the present invention may incorporate an alternating flasher. The circuit is as described above, with the exception that it includes an alternating flasher. The flasher is internally regulated and provides a 12 V current to a 555 timer set-up, of a type available commercially through electronics shops, via resistors and diodes. The timer output turns internal transistors alternatively off and on by interrupting the group lead from the 12 V transformer, thereby causing the light elements to flash on and off alternatively.

Figure 6:
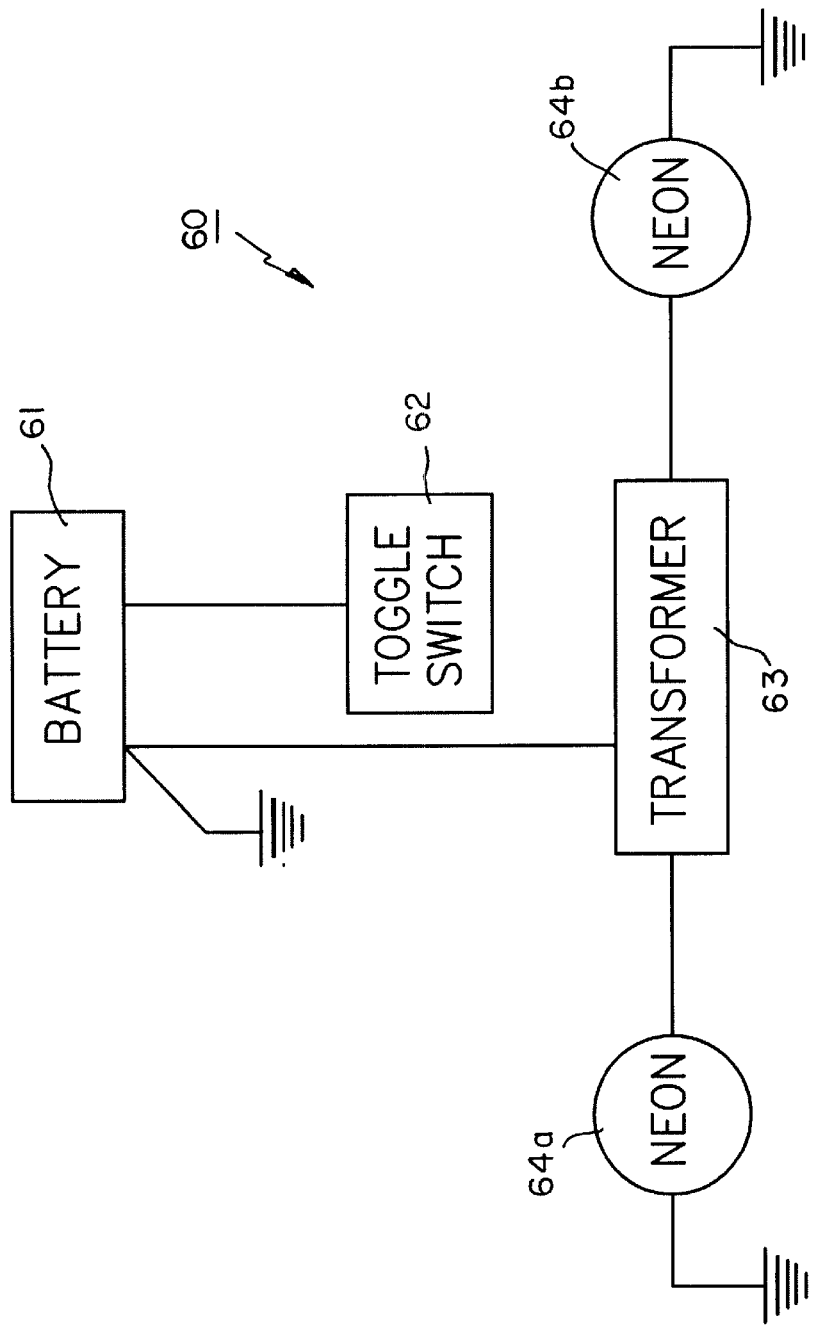
FIG. 6 is a general block diagram flow chart depicting the neon cruising lighting system as contemplated herein.

FIG. 6 is a simplified block diagram of the neon cruising lighting system 60 contemplated herein. The battery 61 is connected into the transformer 63 by electrical coupling. The transformer 63 connects into both neon light emitting elements 64a, 64b. A toggle switch 62 is coupled into the system 60 in between the battery 61 and the transformer 63 as well.

The preferred embodiment of the neon cruising lighting system of the present invention, including the alternative embodiments thereof, can be available in kit form and includes: two inert gas (neon) light elements; one black box; an annular rubber grommet for mounting the neon light elements into a headlight cutout; battery electrical coupling means; and one on/off toggle switch. The flashing neon lighting system embodiment is substantially identical, but includes one flasher.

The electrical components of the present invention are suitably potted, epoxy or silicon polymer encapsulated, or otherwise appropriately substantially sealed to protect them from adverse weather conditions and off-road use.

In use, with respect to the neon lighting system, there is preferably one mounting position, that of the electrical coupling means being attached with suitable attaching means, alongside the periphery of the inside of the vehicle hood.

The on/off toggle switch may be mounted in the dashboard area of the motor vehicle. The transformer is mounted using two screws or by peeling off the release layer of an adhesive foam-type tape, which may be attached thereto or provided therewith, as is the case with all of the electrical components of the present invention. Generally the transformer should be mounted close to the front ends of the neon light elements, but away from any temperature volatile or movable automobile parts. Once the transformer has been mounted, the high voltage wires of the electrical coupling means from the transformer to the front of the neon lighting elements should be operatively connected.

Wiring connectors on all areas preferably should be sealed with high quality electrical tape to ensure non-shorting connections. Tie wraps or tape should be used to keep all wiring away from hot and moving parts of the vehicle. Caution should be taken to avoid contact with high voltage wires, and for any high voltage wires running through any drilled holes, the holes should be deburred and/or silicone should be used over the holes to keep the wires from shorting. Once connected as described above, the toggle switch can be activated.

The installation of the flashing embodiment neon lighting system, particularly the wiring and component connection thereof, is substantially similar to the procedure outlined above.

The foregoing represents a description of preferred embodiments. Variations and modifications of the embodiments described and shown herein will be apparent to persons skilled in the art, without departing from the inventive concepts disclosed herein. All such variations and modifications are intended to be within the scope of the invention, as defined in the following claims.

What is claimed is:

1. A lighting system for use with a motor vehicle battery, comprising:
   (a) a motor vehicle headlight having a reflector;
   (b) a cutout in said reflector;
   (c) an inert gas discharge lamp disposed in said cutout;
   (d) a plug assembly adapted to cooperate with a motor vehicle cigarette lighter power receptacle;
   (e) a transformer electrically coupled to said plug assembly and said inert gas discharge lamp with a coupling means;
   wherein said plug assembly conducts electrical power, through said coupling means, from said battery through said transformer to said inert gas discharge lamp, in order to illuminate said inert gas discharge lamp.

2. The lighting system of claim 1, wherein said inert gas discharge lamp further comprises:
   (a) an envelope formed of a light transmissive material, said envelop having a wall defining an enclosed volume;
   (b) an electrode operatively coupled to said transformer, said electrode extending through said wall to be in contact with said enclosed volume;
   (c) an inert gas fill captured in said enclosed volume capable of providing a wavelength light output upon electrical stimulation by said electrode;
   (d) a phosphor coating enclosed in said envelope, said phosphor being responsive to said wavelength light output to produce a second wavelength light output in a visible range.

3. The lighting system of claim 2, wherein said phosphor coating is selected from the group consisting of Yttrium, Aluminum, Gallium, Oxygen, Cerium, Gadolinium, Lanthanum, and Willemite.

4. The lighting system of claim 2, wherein said phosphor coating has been fired in an alumina crucible.

5. The lighting system of claim 2, wherein there is a reflective coating between said envelop and said phosphor coating, said phosphor coating being adjacent to said inert gas.

6. The lighting system of claim 2, wherein said inert gas fill is a mixture of neon, and an additional gas whose constituents may be selected from the group comprising argon, helium, krypton, nitrogen, radon, and xenon.

7. The lighting system of claim 6, wherein said mixture of inert gas is varied to produce varying colored light.

8. The lighting system of claim 7, wherein said varying colored light is selected from at least one of the following: red, blue, green, purple, aqua, and pink.

9. The lighting system of claim 1, wherein said transformer is a high voltage, high frequency transformer for supplying said inert gas discharge lamp with sufficient high voltage, high frequency electrical power to cause said lamp to irradiate bright glowing light.

10. The lighting system of claim 1, further comprising a rectifier operably coupled into said lighting system for rectifying the power produced by said battery.

11. The lighting system of claim 1, further comprising a flasher operatively coupled into said lighting system for repeatedly, temporarily and alternatively activating said inert gas discharge lamp.

12. The lighting system of claim 2, further comprising a pulse generator connected to said electrode for forming a discharge to electrically stimulate said inert gas fill.

13. The lighting system of claim 1, wherein said inert gas discharge lamp is disposed in said cutout with an annular rubber grommet.

14. The lighting system of claim 1, wherein said inert gas discharge lamp is a self-contained electrodeless inert gas discharge module.

15. The lighting system of claim 13, wherein said self-contained electrodeless inert gas discharge module comprises:

(a) a sealed envelope that is at least partially light transmissive;

(b) an inert gas fill sealed within said envelope; and (c) an RF induction coil external to said sealed envelope, operatively connected to said battery.

16. The lighting system of claim 1, further comprising a circuit breaker switch for disconnecting said lighting system from said electrical power supplied by said cigarette lighter plug receptacle.

17. The lighting system of claim 16, wherein said switch is located on said plug assembly.

18. A method for illuminating a motor vehicle headlight, comprising the steps of:

(a) inserting an inert gas discharge lamp in a motor vehicle headlight cutout;

(b) inserting a cigarette lighter plug assembly into a cigarette lighter plug receptacle;

(c) illuminating said inert gas discharge lamp with electric power transmitted by said cigarette lighter plug assembly.

19. The method of claim 18, wherein said inert gas discharge lamp comprises:

(a) an envelope formed of a light transmissive material, said envelope having a wall defining an enclosed volume;

(b) an electrode operatively coupled to a transformer, said electrode extending through said wall to be in contact with said enclosed volume;

(c) an inert gas fill captured in said enclosed volume capable of providing a wavelength light output upon electrical stimulation by said electrode;

(d) a phosphor coating enclosed in said envelope, said phosphor being responsive to said wavelength light output to produce a second wavelength light output in a visible range.

20. The method of claim 19, wherein said phosphor coating is selected from the group consisting of Yttrium, Aluminum, Gallium, Oxygen, Cerium, Gadolinium, Lanthanum, and Willemite.

21. The method of claim 19, wherein said phosphor coating has been fired in an alumina crucible.

22. The method of claim 19, wherein there is a reflective coating between said envelop and said phospher coating, said phospher coating being adjacent to said inert gas.

23. The method of claim 19, wherein said inert gas fill is a mixture of neon, and an additional gas whose constituents may be selected from the group comprising argon, helium, krypton, nitrogen, radon, and xenon.

24. The method of claim 23, wherein said mixture of inert gas is varied to produce varying colored light.

25. The method of claim 24, wherein said varying colored light is selected from at least one of the following: red, blue, green, purple, aqua, and pink.

26. The method of claim 19, wherein said transformer is a high voltage, high frequency transformer for supplying said inert gas discharge lamp with sufficient high voltage, high frequency electrical power to cause said lamp to irradiate bright glowing light.

27. The method of claim 19, further comprising a rectifier operably coupled into said lighting system for rectifying the power produced by said battery.

28. The method of claim 19, further comprising a flasher operatively coupled into said lighting system for repeatedly, temporarily and alternatively activating said inert gas discharge lamp.

29. The method of claim 19, further comprising a pulse generator connected to said electrode for forming a discharge to electrically stimulate said inert gas fill.

30. The method of claim 19, wherein said inert gas discharge lamp is disposed in said cutout with an annular rubber grommet.

31. The method of claim 18, wherein said inert gas discharge lamp is a self-contained electrodeless inert gas discharge module.

32. The method of claim 31, wherein said self-contained electrodeless inert gas discharge module comprises:

(a) a sealed envelope that is at least partially light transmissive;

(b) an inert gas fill sealed within said envelope; and (c) an RF induction coil external to said sealed envelope, operatively connected to said battery.

33. The method of claim 18, further comprising a circuit breaker switch for disconnecting said lighting system from said electrical power supplied by said cigarette lighter plug assembly.

34. The method of claim 33, wherein said switch is located on said plug assembly.

* * * * *